United States Patent Office 2,993,076
Patented July 18, 1961

2,993,076
PRODUCTION OF PESTICIDAL COMPOUNDS
Hyman M. Molotsky, Chicago, Ill., assignor to Velsicol Chemical Corporation, Chicago, Ill., a corporation of Illinois
No Drawing. Filed Jan. 29, 1959, Ser. No. 789,793
4 Claims. (Cl. 260—617)

This invention relates to new compositions of matter. More specifically, this invention relates to chemical compounds of the formula

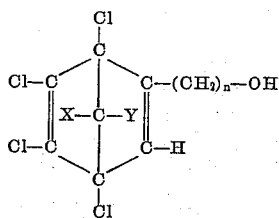

wherein $n$ is a whole number from 1 to 3, and X and Y are selected from the group consisting of chlorine and hydrogen atoms. These new compounds are useful as pesticides, particularly as fungicides and nematocides.

The new compounds of this invention can be prepared readily and in good yield, for example, by the Diels-Alder addition of the appropriate chlorinated cyclopentadiene with an acetylenic alcohol. The reaction can be carried out conveniently by heating the reactants for several hours and then distilling off any unreacted starting materials in vacuo. While the reaction can be effected satisfactorily with equimolecular proportions of the reactants, an excess of the chlorinated diene can be used. A solvent is not essential, but inert solvents can be used if desired. The residue remaining after the distillation of the starting materials is often satisfactory for pesticidal use as such, but the product can be purified, for example, by recrystallization from a suitable solvent.

Chlorinated cyclopentadienes suitable for preparing the compounds of this invention are hexachlorocyclopentadiene (a chemical of commerce), 1,2,3,4,5-pentachlorocyclopentadiene, and 1,2,3,4-tetrachlorocyclopentadiene. The latter two compounds can be obtained, for example, by the catalytic hydrogenation of hexachlorocyclopentadiene in the presence of a platinum or palladium catalyst as described by McBee and Smith, J. Am. Chem. Soc. 77, 389 (1955). When hexachlorocyclopentadiene is used as the starting material, both X and Y are chlorine atoms in the final product. When 1,2,3,4,5-pentachlorocyclopentadiene is used, one of X or Y is a chlorine atom and the other is a hydrogen atom. When 1,2,3,4-tetrachlorocyclopentadiene is used, both X and Y are hydrogen atoms.

Suitable acetylenic alcohols for use in preparing the compounds of this invention are propargyl alcohol, 3-butyn-1-ol, and 4-pentyl-1-ol. The use of propargyl alcohol, a chemical of commerce, will produce new compounds according to this invention in which $n$ is 1. Compounds in which $n$ is 2 are prepared from 3-butyn-1-ol, which can be synthesized, for example, as described by Henne and Greenlee, J. Am. Chem. Soc. 67, 484–5 (1955). Similarly, compounds in which $n$ is 3 are prepared from 4-pentyn-1-ol, which can be obtained, for example, as described by Paul and Tchelitcheff, Compt. rend. 230, 1473–5 (1950).

The manner in which compounds according to this invention can be prepared is illustrated in the following examples.

EXAMPLE 1

Preparation of 5-hydroxymethyl-1,2,3,4,7,7,-hexachlorobicyclo(2.2.1)-2,5-heptadiene Hexachlorocyclopentadiene (434 g.; 1.59 moles) was heated to 120° C. in a round-bottomed flask fitted with a mechanical stirrer, internal thermometer, reflux condenser, and dropping funnel. Propargyl alcohol (68.5 g.; 1.22 moles) was added dropwise with stirring at this temperature over a period of 3 hours. The temperature of the reaction mixture was then maintained at 120–130° C. for 6 hours, after which it was raised to 155° C. over a period of 2 hours. The unreacted hexachlorocyclopentadiene (207 g.) was distilled off in vacuo. Distillation of the residue in vacuo gave 205 g. (76% of theory) of 5-hydroxymethyl-1,2,3,4,7,7-hexachlorobicyclo(2.2.1)-2,5-heptadiene, boiling at 145° C. under 1.7 mm. pressure. The product solidified on standing and was recrystallized from hexane to give white crystals, melting point 86.5–87.5° C.

Analysis for $C_8H_4Cl_6O$:
Theory—C, 29.21%; H, 1.22%; Cl, 64.68%.
Found—C, 29.13%; H, 1.50%; Cl, 64.54%.

Other new compounds which fall within the scope of this invention can be prepared readily in a manner similar to that detailed above. In the following examples are given the particular acetylenic alcohol and chlorinated cyclopentadiene required to prepare the resulting named compound of this invention, 1,2,3,4-tetrachloro-, 1,2,3,4,5-pentachloro-, and hexachlorocyclopentadiene are designated as A, B, and C, respectively.

EXAMPLE 2

3 - butyn - 1 - ol+C→5-(β-hydroxyethyl)-1,2,3,4,7,7-hexachlorobicyclo(2.2.1)-2,5-heptadiene.

EXAMPLE 3

4 - pentyn - 1 - ol+A→5 - (γ-hydroxypropyl)-1,2,3,4-tetrachlorobicyclo(2.2.1)-2,5-heptadiene.

EXAMPLE 4

Propargyl alcohol+A→5-hydroxymethyl-1,2,3,4-tetrachlorobicyclo(2.2.1)-2,5-heptadiene.

EXAMPLE 5

3 - butyn - 1 - ol+B→5 - (β-hydroxyethyl)-1,2,3,4,7-pentachlorobicyclo(2.2.1)-2,5-heptadiene.

EXAMPLE 6

3 - butyn - 1 - ol+A→5 - (β-hydroxyethyl)-1,2,3,4-tetrachlorobicyclo(2.2.1)-2,5-heptadiene.

EXAMPLE 7

Propargyl alcohol +B→5 - hydroxymethyl - 1,2,3,4,7-pentachlorobicyclo(2.2.1)-2,5-heptadiene.

EXAMPLE 8

4 - pentyn - 1 - ol+B→5 - (γ-hydroxypropyl)-1,2,3,4,7-pentachlorobicyclo(2.2.1)-2,5-heptadiene.

EXAMPLE 9

4 - pentyn - 1 - ol+C→5 - (γ-hydroxypropyl)-1,2,3,4,7,7-hexachlorobicyclo(2.2.1)-2,5-heptadiene.

The compounds of this invention are useful as pesticides, particularly as fungicides and nematocides. Thus, the toxicity of experimental compounds to test spores was determined by the slide germination technique adopted by the Committee on Standardization of Fungicidal Tests of the American Phytopathological Society. Measured concentrations of spores were placed on glass slides in contact with various concentrations of the compound being tested. The percentage germination of spores was then determined for each treatment (two replicates) after 24 hours' incubation at 72° F. The results are recorded below for tests with the compound described in Example 1, 5-hydroxymethyl-1,2,3,4,7,7-hexachlorobicyclo(2.2.1)-2,5-heptadiene.

| Concn., p.p.m. | Organism | Percent Spore Germination | | | ED50, p.p.m. |
|---|---|---|---|---|---|
| | | Rep. 1 | Rep. 2 | Ave. | |
| 100 | Fusarium roseum | 0 | 0 | 0 | 32 |
| 100 | Monilinia fructicola | 0 | 0 | 0 | 20 |

Experiments were also carried out in which acetone solutions of various compounds were dispersed in water with not more than 4 percent acetone by volume in the acetone phase, 4.5 ml. of which were then placed in respective 20 x 75 mm. vials. From 150 to 200 nematodes (*Panagrellus redivivus*), 0.5 ml. by volume, were then introduced into the test solutions. Test vials for one compound only were placed in an individual water-sealed moisture chamber. A control vial of water only plus nematodes was placed in each moisture chamber. Vapor phase toxicity of a given compound was determined by the mortality induced in the control vials (water only plus nematodes) for that particular chamber. Contact toxicity was determined by mortality induced in the test compound vials per se. Two replicates were run at each concentration. The results are expressed as percent living nematodes after the indicated periods of exposure. Results obtained with the product of Example 1 are recorded below.

| Compound | Concn., p.p.m. | Percent Nematodes Living After— | | | | | | ED50, p.p.m. |
|---|---|---|---|---|---|---|---|---|
| | | 24 hrs. | | 48 hrs. | | 72 hrs. | | |
| Example 1 | 100 | 0 | 0 | 0 | 0 | 0 | 0 | 8 |
| Control | | 102 | 100 | 102 | 105 | 103 | 105 | |
| | | 101 | 101 | 104 | 102 | 104 | 103 | |

Experiments were also carried out for the control of root knot nematodes, *Meloidogyn incognita*. Potted greenhouse soil, inoculated with the nematode, was treated by soil drench procedures with aqueous solutions or dispersions of the test compounds at various concentrations. Approximately 10 days after treament, Bonny Best tomato seedlings were transplanted to the test pots and maintained under greenhouse conditions. The nematocidal effectiveness of the treatments was determined by the severity of root knot gall formation on the root structures 30 days after transplanting. A root knot index was established on the basis of percent root tissue galled: 0=no visible galls; 1=1–25%; 2=26–50%; 3=51–75%; 4=76–100%. The results obtained with the product of Example 1 are given below.

| Compound | Concn. in lbs./acre | Root Knot Index | | |
|---|---|---|---|---|
| | | 1 | 2 | Ave. |
| Example 1 | 150 | 1 | 1 | 1 |
| Do | 300 | 0 | 0 | 0 |
| Control | | | | 3.4 |

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corms, and rhizomes are thus more apt to be infected than above-ground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifest as rotting of the attached part and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage applications, post-planting sidedress applications, and the like are also useful. The active compounds of this invention are applied in amounts sufficient to exert the desired nematocidal action. The amount of the active compound present in the pesticidal compositions as actually applied for preventing or controlling pest infestations varies with the type of application, the particular pests which are to be controlled, the purpose for which the treatment is made, and the like. Generally, the solid or liquid pesticidal compositions of this invention will contain from about 0.5% to about 90% of the active compounds.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogenous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 10

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

| | |
|---|---|
| 5-hydroxymethyl-1,2,3,4,7,7-hexachlorobicyclo(2.2.1)-2,5-heptadiene | 25 |
| Sodium lauryl sulfate | 2 |
| Sodium lignin sulfonate | 3 |
| Kerosene | 70 |

EXAMPLE 11

*Preparation of a wettable powder*

The following components are mixed intimately in conventional mixing or blending equipment and are then ground to a powder having an average particle size of less than about 50 microns. The finished powder is dispersed in water to give the desired concentration of active compound.

| | |
|---|---|
| 5-($\beta$-hydroxyethyl)-1,2,3,4,7,7-hexachlorobicyclo-(2.2.1)-2,5-heptadiene | 75.00 |
| Fuller's earth | 22.75 |
| Sodium lauryl sulfate | 2.00 |
| Methyl cellulose | .25 |

EXAMPLE 12

*Preparation of an oil-dispersible powder*

The following components are blended and ground as described in the previous example to give a powder which can be dispersed in oil to form a spray containing the desired concentration of active compound.

| | |
|---|---|
| 5-($\gamma$-hydroxypropyl)-1,2,3,4,7,7 - hexachlorobicyclo-(2.2.1)-2,5-heptadiene | 70 |
| Condensation product of diamylphenol with ethylene oxide | 4 |
| Fuller's earth | 26 |

EXAMPLE 13

*Preparation of a dust*

The following ingredients are mixed thoroughly and then ground to an average particle size of less than about 50 microns to give a dust suitable for application with conventional dusting equipment.

| | |
|---|---|
| 5-hydroxymethyl-1,2,3,4 - tetrachlorobicyclo(2.2.1)-2,5-heptadiene | 20 |
| Talc | 80 |

EXAMPLE 14

*Preparation of a granular formulation*

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 5-hydroxymethyl-1,2,3,4,7-pentachlorobicyclo(2.2.1)-2,5-heptadiene | 10 |
| Fuller's earth | 66 |
| Dextrin | 20 |
| Sodium lignin sulfonate | 3 |
| Kerosene | 1 |

I claim:
1. A compound of the formula

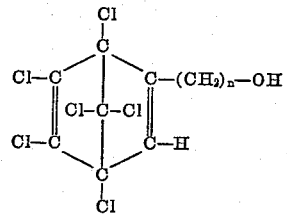

wherein $n$ is a whole number from 1 to 3.

2. 5-hydroxymethyl - 1,2,3,4,7,7- - hexachlorobicyclo-(2.2.1)-2,5-heptadiene.

3. 5-($\beta$-hydroxyethyl) - 1,2,3,4,7,7 - hexachlorobicyclo-(2.2.1)-2,5-heptadiene.

4. 5-($\gamma$-hydroxypropyl)-1,2,3,4,7,7 - hexachlorobicyclo-(2.2.1)-2,5-heptadiene.

References Cited in the file of this patent

UNITED STATES PATENTS

| | | |
|---|---|---|
| 2,352,606 | Alder et al. | July 4, 1944 |
| 2,841,484 | Johnson | July 1, 1958 |

OTHER REFERENCES

Robitschek et al.: Ind. and Eng. Chem., vol. 46, pages 1628, 1629, 1632 (3 pages; August 1954).

Roberts: Chem. and Industry (Feb. 1, 1958), pages 110–115 (6 pages).